United States Patent
Prasad et al.

(10) Patent No.: US 11,074,531 B2
(45) Date of Patent: Jul. 27, 2021

(54) MACHINE LEARNING TECHNIQUES FOR AUTOMATED PROCESSING OF WORKFLOW APPROVAL REQUESTS

(71) Applicant: EMC IP Holding Company LLC, Hopkington, MA (US)

(72) Inventors: Parmeshwr Prasad, Bangalore (IN); Shishir Choubey, Bangalore (IN); Rahul Gupta, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 78 days.

(21) Appl. No.: 16/400,156

(22) Filed: May 1, 2019

(65) Prior Publication Data
US 2020/0349481 A1    Nov. 5, 2020

(51) Int. Cl.
*G06Q 10/06*    (2012.01)
*G06N 20/00*    (2019.01)

(52) U.S. Cl.
CPC ......... *G06Q 10/0633* (2013.01); *G06N 20/00* (2019.01)

(58) Field of Classification Search
CPC ........................ G06Q 10/0633; G06N 20/00
See application file for complete search history.

(56) References Cited

U.S. PATENT DOCUMENTS

| | | | |
|---|---|---|---|
| 8,200,527 B1* | 6/2012 | Thompson | G06Q 10/06398 705/7.39 |
| 9,332,011 B2 | 5/2016 | Sannegowda et al. | |
| 2003/0084067 A1* | 5/2003 | Obiaya | G06Q 10/06 |
| 2003/0126001 A1* | 7/2003 | Northcutt | G06Q 10/10 705/7.15 |
| 2004/0230468 A1* | 11/2004 | King | G06Q 10/06375 705/7.28 |
| 2005/0108151 A1 | 5/2005 | York | |

(Continued)

OTHER PUBLICATIONS

"Intelligent project approval cycle for local government: case-based reasoning approach", MK Farooq, MJ Khan, S Shamail . . . —Proceedings of the 3rd . . . , 2009—dl.acm.org (Year: 2009).*

(Continued)

*Primary Examiner* — Jonathan G Sterrett
(74) *Attorney, Agent, or Firm* — Ryan, Mason & Lewis, LLP (57) ABSTRACT

Methods, apparatus, and processor-readable storage media for machine learning techniques for automated processing of workflow approval requests are provided herein. An example computer-implemented method includes generating a machine learning model for workflow approval requests, wherein generating the machine learning model comprises automatically learning temporal-based patterns from historical data related to previous workflow approval requests; generating, in response to an additional workflow approval request, an output value by applying the machine learning model to input data related to the additional workflow approval request; comparing the output value to at least one predefined threshold value; and automatically rejecting the additional workflow approval request responsive to a result of the comparing of the output value to the at least one predefined threshold value.

20 Claims, 5 Drawing Sheets

(56) References Cited

U.S. PATENT DOCUMENTS

| | | | |
|---|---|---|---|
| 2007/0088585 A1* | 4/2007 | Maguire | G06Q 10/06 |
| | | | 705/301 |
| 2015/0095097 A1 | 4/2015 | DeJardine et al. | |
| 2018/0053114 A1* | 2/2018 | Adjaoute | G06N 3/02 |
| 2018/0159887 A1 | 6/2018 | DiGiambattista et al. | |
| 2019/0108603 A1* | 4/2019 | Waslander | G06Q 50/163 |
| 2019/0114566 A1* | 4/2019 | Lapierre | G06Q 10/087 |

OTHER PUBLICATIONS

"Evolutionary fuzzy decision model for construction management using support vector machine", MY Cheng, AFV Roy—Expert Systems with Applications, 2010—Elsevier (Year: 2010).*

Project success prediction using an evolutionary support vector machine inference model MY Cheng, YW Wu, CF Wu—Automation in Construction, 2010—Elsevier (Year: 2010).*

Kernel Method, retrieved from https://en.wikipedia.org/wiki/Kernel_method on Sep. 11, 2020. (Year: 2020).*

Design and implementation of examination and approval system based on CBR H Lin, GJ Zhang, SJ Li, YC Qiu—Proceedings of the 2003 . . . , 2003—ieeexplore.ieee.org (Year: 2003).*

* cited by examiner

MACHINE LEARNING TECHNIQUES FOR AUTOMATED PROCESSING OF WORKFLOW APPROVAL REQUESTS

FIELD

The field relates generally to information processing systems, and more particularly to techniques for data management in such systems.

BACKGROUND

Approval requests for access, authorizations, etc. are commonly sought and/or required in various company and other enterprise-related contexts. Certain existing request approval arrangements face efficiency challenges, as they depend on human availability and/or bandwidth. For example, in a typical production environment workflow, serial approvals are often utilized to complete an approval process, wherein serial approvals result in serial dependencies of approvals. However, such serial dependencies generally cause temporal delays in the approval process. Additionally, conventional process approval approaches do not include effective approval logic to optimize such instances, particularly in light of various process-specific parameters.

SUMMARY

Illustrative embodiments of the disclosure provide machine learning techniques for automated processing of workflow approval requests. An exemplary computer-implemented method includes generating a machine learning model for workflow approval requests, wherein generating the machine learning model includes automatically learning one or more temporal-based patterns from historical data related to one or more previous workflow approval requests. Such a method also includes generating, in response to an additional workflow approval request, an output value of the machine learning model by applying the machine learning model to input data related to the additional workflow approval request. Additionally, such a method includes comparing the output value to at least one predefined threshold value, and automatically rejecting the additional workflow approval request responsive to a result of the comparing of the output value to the at least one predefined threshold value.

Illustrative embodiments can provide significant advantages relative to conventional process approval techniques. For example, challenges associated with temporal delays are overcome through a machine learning-based solution enabling prediction of an exact case when auto-rejection of an approval request is to be triggered, with such a machine learning-based solution incorporating environment-based information and various forms of relevant input data.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
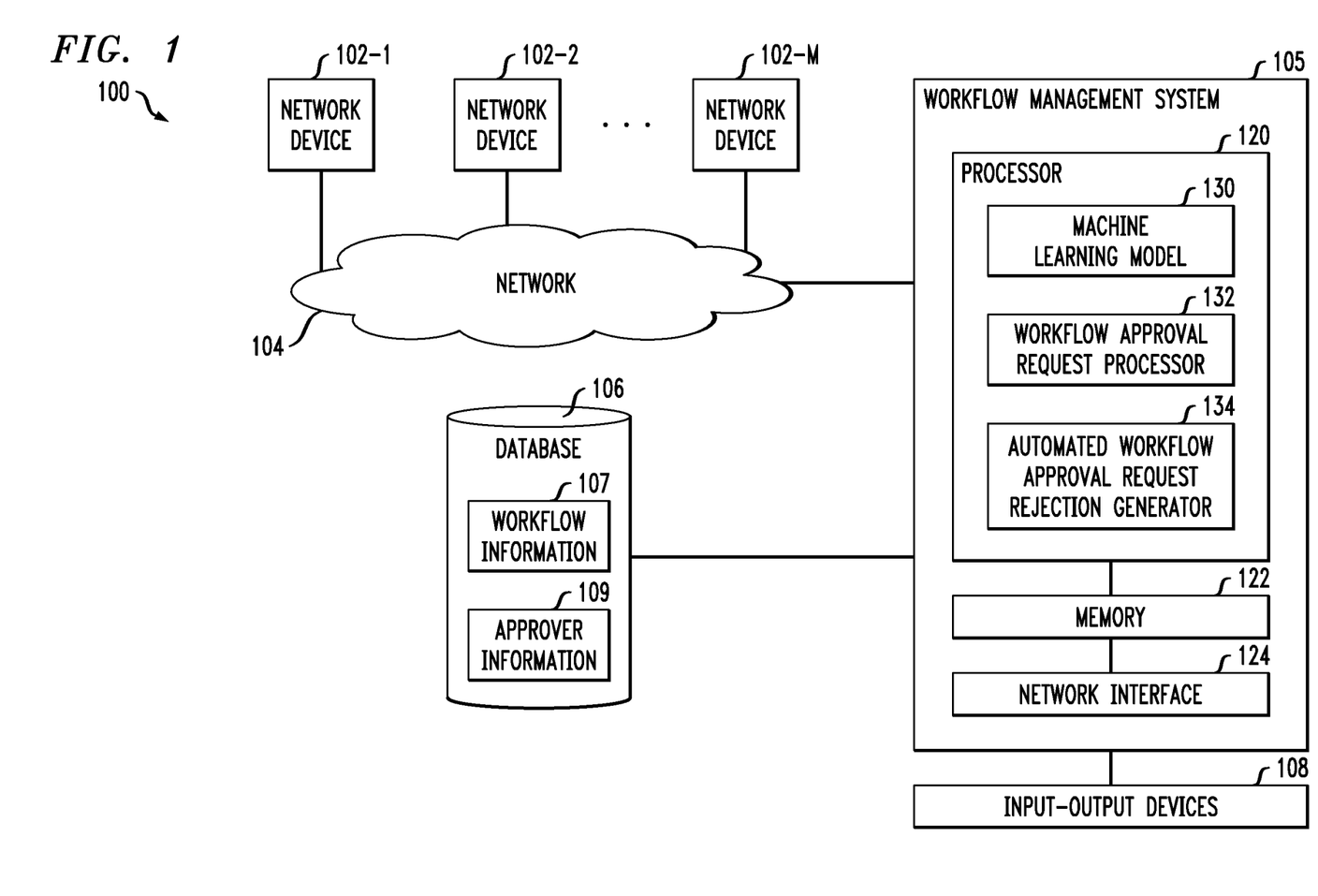
FIG. 1 shows an information processing system configured for machine learning techniques for automated processing of workflow approval requests in an illustrative embodiment.

FIG. 1 shows a computer network (also referred to herein as an information processing system) 100 configured in accordance with an illustrative embodiment. The computer network 100 comprises a plurality of network devices 102-1, 102-2, . . . 102-M, collectively referred to herein as network devices 102. The network devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is workflow management system 105.

The network devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The network devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the workflow management system 105 can have an associated database 106 configured to store data 107 pertaining to workflow information, which comprise, for example, dependency information, temporal information, historical data pertaining to workflow approval requests, etc. Also, database 106 is configured to store data 109 pertaining to approver information, which comprise, for example, historical data pertaining to workflow approval request decisions and related temporal information.

The database 106 in the present embodiment is implemented using one or more storage systems associated with the workflow management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the workflow management system 105 are input-output devices 108, which illustratively comprise keyboards, displays or other types of input-output devices in any combination. Such input-output devices can be used, for example, to support one or more user interfaces to the workflow management system 105, as well as to support communication between the workflow management system 105 and other related systems and devices not explicitly shown.

The workflow management system 105 in the FIG. 1 embodiment is assumed to be implemented using at least one processing device. Each such processing device generally comprises at least one processor and an associated memory, and implements one or more functional modules for controlling certain features of the workflow management system 105.

More particularly, the workflow management system 105 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the workflow management system 105 to communicate over the network 104 with the network devices 102, and illustratively comprises one or more conventional transceivers.

The processor 120 further comprises a machine learning model 130, a workflow approval request processor 132, and an automated workflow approval request rejection generator 134.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the machine learning model 130, workflow approval request processor 132, and automated workflow approval request rejection generator 134 may be implemented at least in part in the form of software that is stored in memory 122 and executed by processor 120.

It is to be understood that the particular set of elements shown in FIG. 1 for automated processing of workflow approval requests involving network devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing machine learning model 130, workflow approval request processor 132, and automated workflow approval request rejection generator 134 of the workflow management system 105 in computer network 100 will be described in more detail with reference to the flow diagram of FIG. 4.

Accordingly, at least one embodiment of the invention includes configuring a workflow approval process wherein an administrator or application owner can implement a machine learning algorithm for automated rejections of workflow approval requests and/or portions thereof. In one or more embodiments, a workflow approval request personnel (also referred to herein as an approver) can, at any time in the future, take manual action to approve a workflow approval request that has been automatically rejected and/or denied by the machine learning algorithm. As further detailed herein, one or more embodiments include utilizing support vector machine (SVM) learning to generate and implement a machine learning model that learns temporal-based patterns related to workflow approval requests on a continuous and/or ongoing basis.

Figure 2:
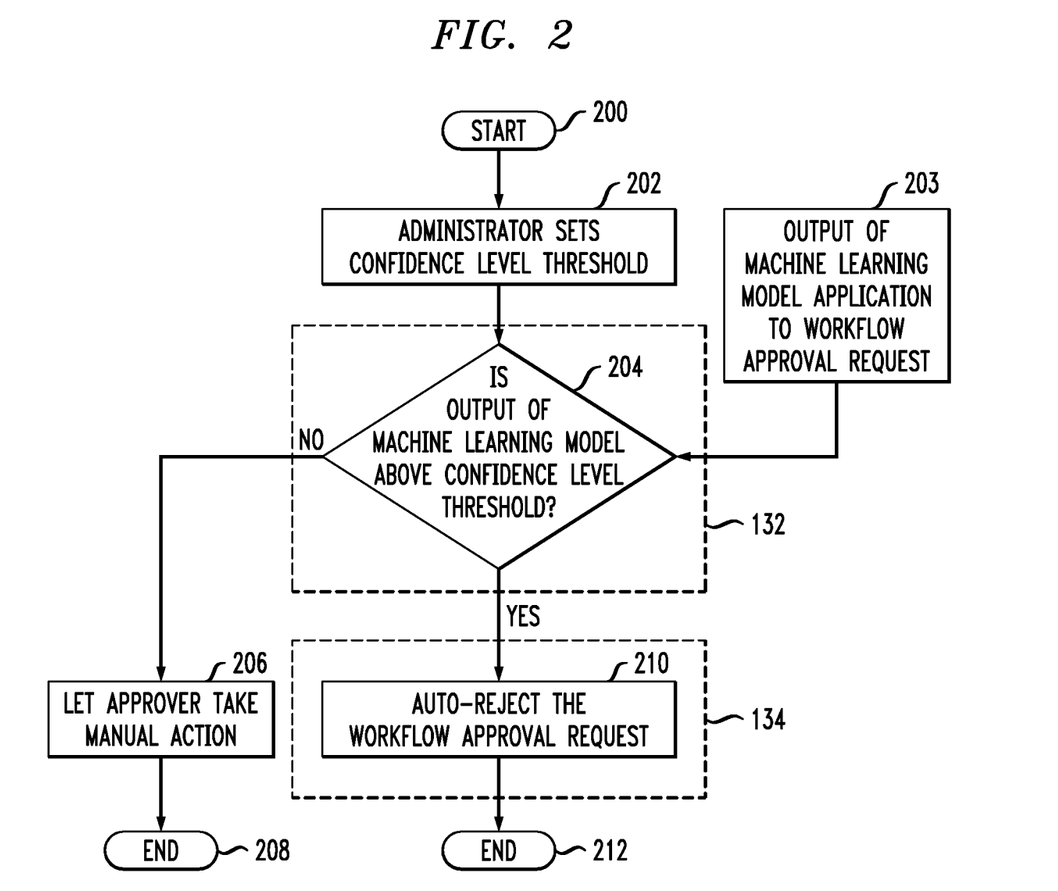
FIG. 2 is a flow diagram of an example process for machine learning techniques for automated processing of workflow approval requests in an illustrative embodiment.

FIG. 2 is a flow diagram of an example process for machine learning techniques for automated processing of workflow approval requests in an illustrative embodiment. The process begins in step 200, and step 202 includes an administrator (admin) setting a confidence level (CL) threshold, which is then provided to the workflow approval request processor 132 (of workflow management system 105). Additionally, output 203 of the machine learning model (130) applied to a workflow approval request is also provided to the workflow approval request processor 132. As a function of the workflow approval request processor 132, step 204 includes determining whether the output 203 includes a value that is higher/above the confidence level threshold. If no (that is, the output is lower/below the confidence level threshold), then step 206 includes enabling a (human) approver to take manual action with respect to the workflow approval request, and the process subsequently ends at step 208. If yes (that is, the output is higher/above the confidence level threshold), then in step 210, the automated workflow approval request rejection generator 134 automatically rejects the workflow approval request, and the process subsequently ends at step 212.

In one or more example embodiments, the administrator or application owner choose a confidence level (CL) value between 0% to 100%. In such an example embodiment, if the confidence level of a particular approver is higher than the configured threshold value set by the administrator or application owner, then the corresponding workflow approval request will be auto-rejected by the workflow management system (105). By way merely of illustration, assume that an administrator sets the confidence level for a particular workflow at X % for the entire system. If, for a particular approver in the workflow, the confidence level for that approver is higher than X %, then auto-rejection is triggered; else, the system (105) will enable and wait for the approver's decision.

As detailed herein, in one or more embodiments, at least one machine learning model/algorithm for workflow approval requests is generated based at least in part on various forms of data. Such data can include, for example, approver history data, criticality index data, data pertaining to time elapses for one or more approvals, data pertaining to time between action by two approvers, department-related data, job status data, etc. Approver history data (ah) pertains to historical behavior of any approver with respect to workflow approval requests that he or she previously approved. If the tendency of a person/approver is to approve a certain type of workflow approval request, then weightage of this input will be higher/increased if a similar type of workflow approval request is handled by the same person/approver.

With respect to criticality index data (ci), some types of workflow approval requests can include an addition of an account and/or a deletion of an account. In such an example, a criticality index will indicate the importance of such executions. For instance, account addition for a given software application may not be as critical as adding an account directed to a finance department.

Additionally, in one or more embodiments, data pertaining to time elapses for one or more approvals (te) can include weightage values that are higher/increased with trivial and/or less important workflows, and are lower/decreased when a critical workflow is involved. Also, in at least one embodiment, data pertaining to time between action by two approvers (t2) is utilized in the context of a serial dependent workflow approval process. In such a context the data (t2) represents the time difference between action taken by (n+1)–n approver.

With respect to department-related data (d), a workflow can be derived from and/or involved with different departments (such as, for example, development, finance, exit process, human resources, etc.), and based on the particular departments involved, different weightage values can be applied and/or utilized. Also, in one or more embodiments, with respect to job status data (js), each workflow can be raised for one individual, and based on the individual's job and/or role, a given weightage can be applied to and/or utilized for the corresponding workflow.

In at least one embodiment, data such as detailed above can be exported, for example, to a comma separated values (CSV) file, and subsequently read and/or imported (e.g., by workflow management system 105) using one or more standard techniques. Further, based at least in part on the data stored on the CSV file, such data can be used in training the at least one machine learning model/algorithm in one or more embodiments.

Also, in at least one embodiment, the machine learning model/algorithm includes an SVM algorithm that is trained based on supervised learning of data (such as the example types of data detailed above) and that outputs an optimal classifier to categorize input data (to which the SVM algorithm is applied). To achieve such categorization, at least one embodiment can include employing one or more transformations and/or regularizations. Such action can be visualized, for example, on a hypothetical multidimensional space by a separating hyperplane.

Additionally, one or more embodiments include modifying and/or improving the accuracy of a given SVM model via the use of one or more SVM tuning parameters. Such tuning parameters can include, for example, a kernel parameter, a regularization parameter, a gamma parameter, a margin parameter, etc. With respect to the kernel parameter, at least one embodiment includes utilizing the polynomial kernel for the machine learning model/algorithm. In such an embodiment, the kernel (K) is applied to each training data instance to optimally categorize the training data in a higher dimension space, such as illustrated in the following equations: $K(x, xi)=1+sum(x*xi)^d$; and $K(x, xi)=exp(-gamma*sum((x-xi^2))$; wherein x=the input/training data, xi=the support vector, and "d" refers to the degree of the polynomial (which, for a polynomial kernel, is more than 1).

Additionally, in one or more embodiments, the regularization parameter depicts the extent to which the machine learning model/algorithm can misclassify each instance/item of training data. Also, in at least one embodiment, in the machine learning model/algorithm, the gamma parameter determines the extent of influence of particular data points based on the proximity of those data points from the hyperplane. Further, in one or more embodiments, with respect to the margin parameter, a desired and/or valued margin is represented by a scenario wherein the proximity to the closest data points is similar for both classes from the hyperplane. As used herein, "classes" refer to different groups, and a hyperplane is used to differentiate between classes.

Figure 3:
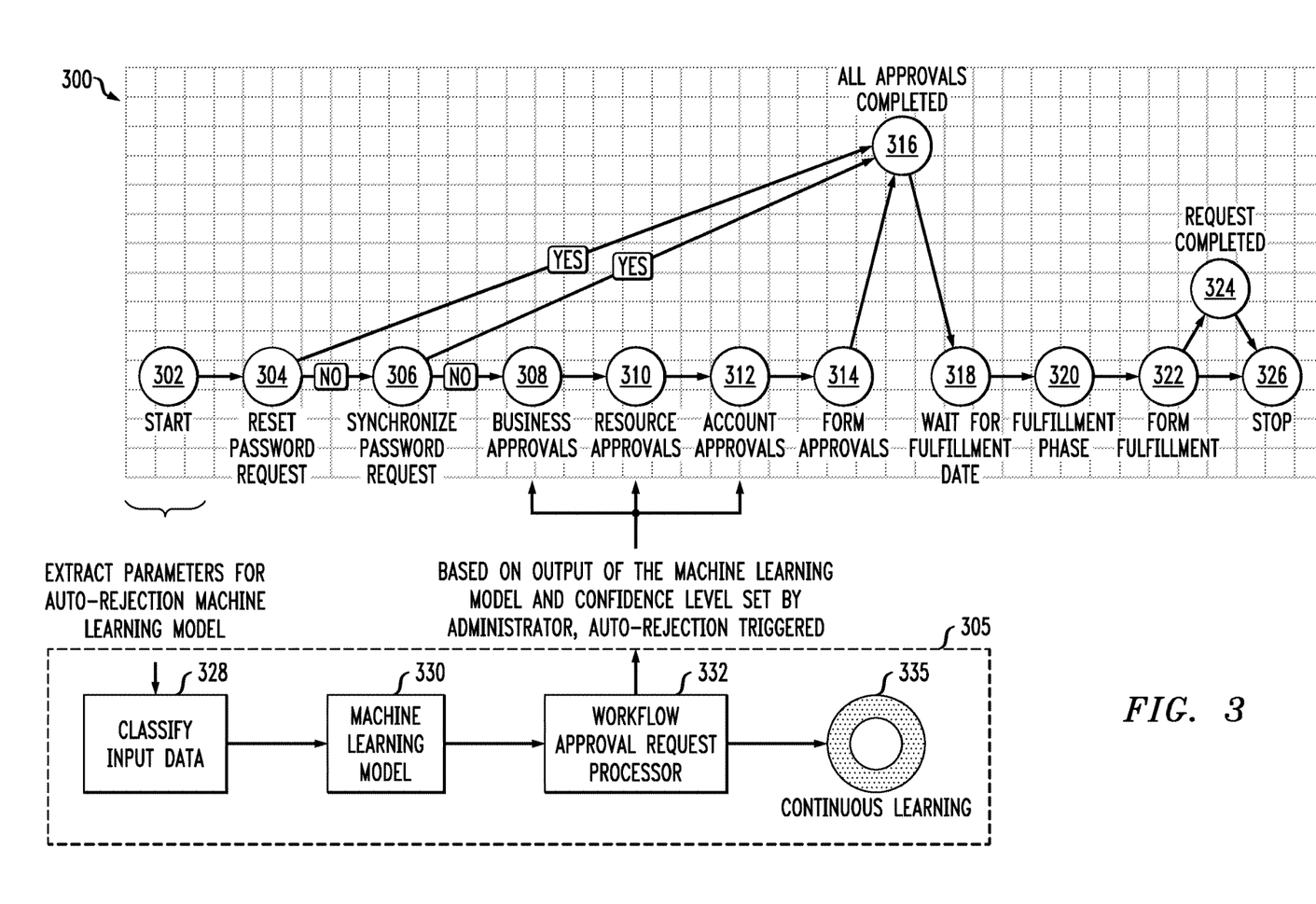
FIG. 3 shows an example sequence of machine learning techniques for automated processing of workflow approval requests in an illustrative embodiment.

FIG. 3 shows an example sequence of machine learning techniques for automated processing of workflow approval requests in an illustrative embodiment. By way of illustration, FIG. 3 depicts an example workflow 300, which includes starting the workflow in step 302, and a request for resetting a password in step 304. If the step 304 request is approved, the workflow continues to step 316. If the step 304 request is rejected, then the workflow continues to step 306, which includes a request for synchronizing the password. If the step 306 request is approved, the workflow continues to step 316. If the step 306 request is rejected, then the workflow continues to step 308, which includes requesting business approvals, step 310, which includes requesting resource approvals, step 312, which includes requesting account approvals, and step 314, which includes requesting form approvals. After successful completion of step 314, the workflow continues to step 316 (whereby all approvals are completed), and the workflow then continues to step 318, which includes waiting for a fulfillment date. Subsequently, step 320 includes a fulfillment phase, step 322 includes form fulfillment, step 324 includes completion of the workflow request process, and the workflow ends in step 326.

FIG. 3 also depicts workflow management system 305. In step 328, the workflow management system 305 classifies input data, which includes extracting one or more parameters from workflow 300. The classified input data is then provided to machine learning model 330, which is applied to the input data to generate an output, which is provided to workflow approval request processor 332. Based on the output of the machine learning model 330 and the confidence level set by the administrator (admin) or application owner, the workflow approval request processor automatically rejects one or more of the approval requests at steps 308, 310 and/or 312. The decision(s) and/or determination(s) of the workflow approval request processor 332 are then utilized by a continuous learning mechanism 335 within the workflow management system 305.

Figure 4:
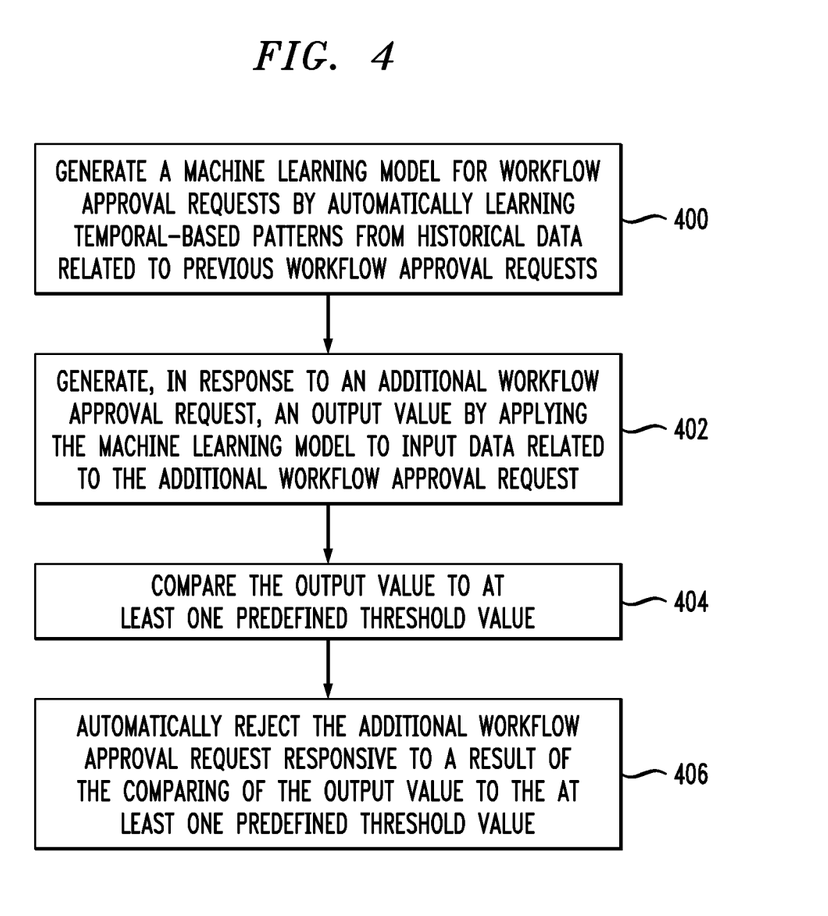
FIG. 4 is a flow diagram of a process for machine learning techniques for automated processing of workflow approval requests in an illustrative embodiment.

FIG. 4 is a flow diagram of a process for machine learning techniques for automated processing of workflow approval requests in an illustrative embodiment. It is to be understood that this particular process is only an example, and additional or alternative processes can be carried out in other embodiments.

In this embodiment, the process includes steps 400 through 406. These steps are assumed to be performed by the processor 120 utilizing its modules 130, 132 and 134.

Step 400 includes generating a machine learning model for workflow approval requests, wherein generating the machine learning model comprises automatically learning one or more temporal-based patterns from historical data related to one or more previous workflow approval requests. In at least one embodiment, the machine learning model includes a support vector machine learning model. The historical data can include, for example, data pertaining to historical behavior of one or more workflow approval request personnel and/or data pertaining to a criticality index associated with one or more workflows. Additionally, the historical data can include, for example, data pertaining to elapsed temporal periods for multiple types of workflow approval requests and/or data pertaining to one or more temporal periods between workflow approval request approvals by distinct workflow approval request personnel.

Step 402 includes generating, in response to an additional workflow approval request, an output value of the machine learning model by applying the machine learning model to input data related to the additional workflow approval request. Step 404 includes comparing the output value to at least one predefined threshold value. In at least one embodiment, the at least one predefined threshold value includes one or more confidence level thresholds attributed to one or more workflows.

Step 406 includes automatically rejecting the additional workflow approval request responsive to a result of the comparing of the output value to the at least one predefined threshold value. In at least one embodiment, automatically rejecting the additional workflow approval request includes automatically rejecting at least a portion of the additional workflow approval request. Additionally, in one or more embodiments, automatically rejecting the additional workflow approval request includes automatically rejecting the additional workflow approval request upon a determination that the output value meets or exceeds the at least one predefined threshold value.

The techniques depicted in FIG. 4 can also include outputting, to one or more workflow approval request personnel (also referred to herein as an approver) for manual action, an indication of non-rejection for the additional workflow approval request. Further, one or more embodiments include tuning the machine learning model based at least in part on one or more tuning parameters. The one or more tuning parameters can include, for example, a kernel parameter pertaining to a kernel function applied to the historical data related to one or more workflow approval requests, wherein the kernel function includes, e.g., a polynomial kernel. The one or more tuning parameters can also include, for example, a regularization parameter pertaining to rates of successful classification by the machine learning model, a gamma parameter pertaining to an extent of influence of one or more data points based on proximity of the one or more data points from a hyperplane, and/or a margin parameter pertaining to proximity to one or more closest data points and similarity to one or more classes from a hyperplane.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to provide a machine learning-based solution. These and other embodiments can effectively enable prediction of particular instances when automated rejection of a workflow approval request is to be triggered.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
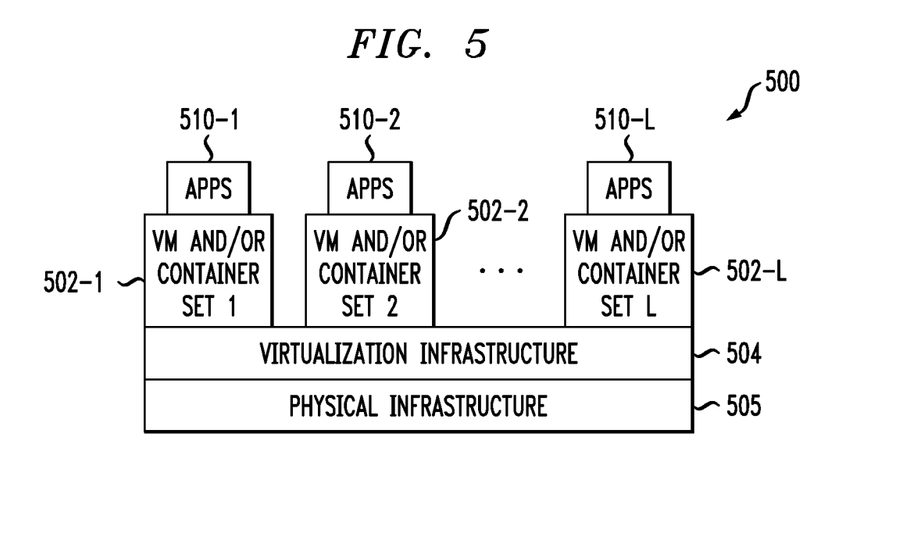
FIGS. 5 and 6 show examples of processing platforms that may be utilized to implement at least a portion of an information processing system in illustrative embodiments.
Figure 6:
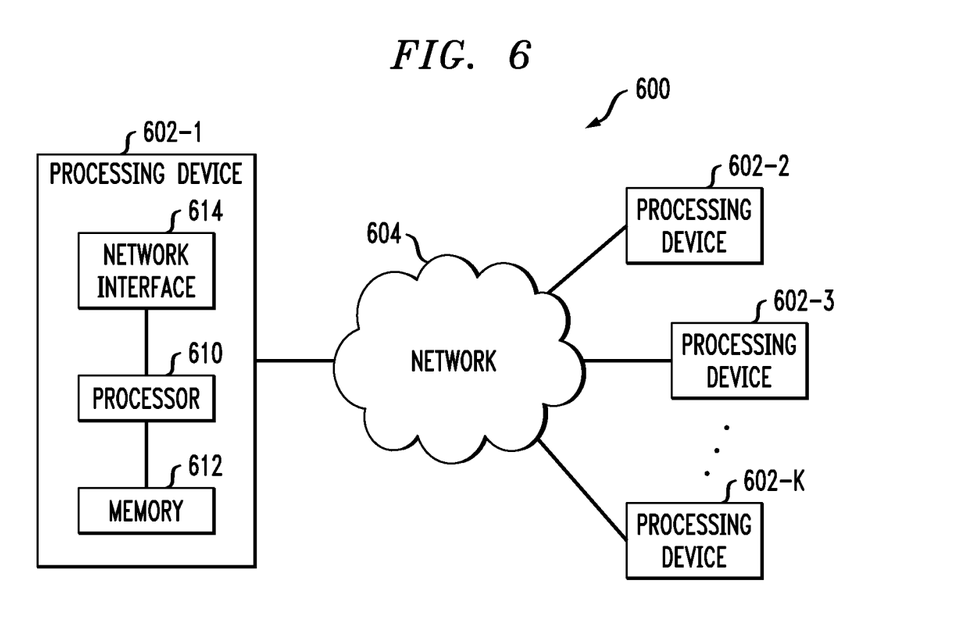

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

An example of a hypervisor platform used to implement a hypervisor within the virtualization infrastructure 504 is the VMware® vSphere® which has an associated virtual infrastructure management system such as the VMware® vCenter™. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

training a machine learning model for workflow approval requests, wherein training the machine learning model comprises automatically learning one or more temporal-based patterns from historical data related to one or more previous workflow approval requests, wherein the historical data comprise three or more of workflow approval request decisions attributed to multiple workflow approval request personnel, workflow approval requests involving at least one account addition, workflow approval requests involving at least one account deletion, amount of time elapsed between workflow approval requests and corresponding workflow approval request decisions, amount of time elapsed between action by two or more workflow approval request personnel in connection with a workflow approval request decision, and identifying information of departments attributed to one or more workflow approval request decisions;

generating, in response to an additional workflow approval request, an output value of the machine learning model by processing input data related to the additional workflow approval request using the trained machine learning model;

comparing the output value to at least one predefined threshold value;

automatically rejecting the additional workflow approval request responsive to a result of the comparing of the output value to the at least one predefined threshold value;

performing at least one automated action based at least in part on the rejection of the additional workflow approval request; and further training the machine learning model using information pertaining to the rejection of the additional workflow approval request, wherein further training the machine learning model comprises tuning the machine learning model based at least in part on one or more tuning parameters, and wherein the one or more tuning parameters comprises a margin parameter pertaining to proximity to one or more closest data points and similarity to one or more classes from a hyperplane;

wherein the method is performed by at least one processing device comprising a processor coupled to a memory.

2. The computer-implemented method of claim 1, wherein the machine learning model comprises a support vector machine learning model.

3. The computer-implemented method of claim 1, wherein performing at least one automated action comprises outputting, to one or more workflow approval request personnel for manual action, an indication of non-rejection for the additional workflow approval request.

4. The computer-implemented method of claim 1, wherein the at least one predefined threshold value comprises one or more confidence level thresholds attributed to one or more workflows.

5. The computer-implemented method of claim 1, wherein the one or more tuning parameters comprises a kernel parameter pertaining to a kernel function applied to the historical data related to one or more workflow approval requests.

6. The computer-implemented method of claim 5, wherein the kernel function comprises a polynomial kernel.

7. The computer-implemented method of claim 1, wherein the one or more tuning parameters comprises a regularization parameter pertaining to rates of successful classification by the machine learning model.

8. The computer-implemented method of claim 1, wherein the one or more tuning parameters comprises a gamma parameter pertaining to an extent of influence of one or more data points based on proximity of the one or more data points from a hyperplane.

9. The computer-implemented method of claim 1, wherein automatically rejecting the additional workflow approval request comprises automatically rejecting at least a portion of the additional workflow approval request.

10. The computer-implemented method of claim 1, wherein automatically rejecting the additional workflow approval request comprises automatically rejecting the additional workflow approval request upon a determination that the output value meets or exceeds the at least one predefined threshold value.

11. A non-transitory processor-readable storage medium having stored therein program code of one or more software programs, wherein the program code when executed by at least one processing device causes the at least one processing device:
to train a machine learning model for workflow approval requests, wherein training the machine learning model comprises automatically learning one or more temporal-based patterns from historical data related to one or more previous workflow approval requests, wherein the historical data comprise three or more of workflow approval request decisions attributed to multiple workflow approval request personnel, workflow approval requests involving at least one account addition, workflow approval requests involving at least one account deletion, amount of time elapsed between workflow approval requests and corresponding workflow approval request decisions, amount of time elapsed between action by two or more workflow approval request personnel in connection with a workflow approval request decision, and identifying information of departments attributed to one or more workflow approval request decisions;
to generate, in response to an additional workflow approval request, an output value of the machine learning model by processing input data related to the additional workflow approval request using the trained machine learning model;
to compare the output value to at least one predefined threshold value;
to automatically reject the additional workflow approval request responsive to a result of the comparing of the output value to the at least one predefined threshold value;
to perform at least one automated action based at least in part on the rejection of the additional workflow approval request; and
to further train the machine learning model using information pertaining to the rejection of the additional workflow approval request, wherein further training the machine learning model comprises tuning the machine learning model based at least in part on one or more tuning parameters, and wherein the one or more tuning parameters comprises a margin parameter pertaining to proximity to one or more closest data points and similarity to one or more classes from a hyperplane.

12. The non-transitory processor-readable storage medium of claim 11, wherein the machine learning model comprises a support vector machine learning model.

13. The non-transitory processor-readable storage medium of claim 11, wherein performing at least one automated action comprises outputting, to one or more workflow approval request personnel for manual action, an indication of non-rejection for the additional workflow approval request.

14. The non-transitory processor-readable storage medium of claim 11, wherein the at least one predefined threshold value comprises one or more confidence level thresholds attributed to one or more workflows.

15. The non-transitory processor-readable storage medium of claim 11, wherein the one or more tuning parameters comprises a kernel parameter pertaining to a kernel function applied to the historical data related to one or more workflow approval requests.

16. The non-transitory processor-readable storage medium of claim 11, wherein the one or more tuning parameters comprises a regularization parameter pertaining to rates of successful classification by the machine learning model.

17. An apparatus comprising:
at least one processing device comprising a processor coupled to a memory;
the at least one processing device being configured:
to train a machine learning model for workflow approval requests, wherein training the machine learning model comprises automatically learning one or more temporal-based patterns from historical data related to one or more previous workflow approval requests, wherein the historical data comprise three or more of workflow approval request decisions attributed to multiple workflow approval request personnel, workflow approval requests involving at least one account addition, workflow approval requests involving at least one account deletion, amount of time elapsed between workflow approval requests and corresponding workflow approval request decisions, amount of time elapsed between action by two or more workflow approval request personnel in connection with a workflow approval request decision, and identifying information of departments attributed to one or more workflow approval request decisions;
to generate, in response to an additional workflow approval request, an output value of the machine learning model by processing input data related to the additional workflow approval request using the trained machine learning model;
to compare the output value to at least one predefined threshold value;
to automatically reject the additional workflow approval request responsive to a result of the comparing of the output value to the at least one predefined threshold value;
to perform at least one automated action based at least in part on the rejection of the additional workflow approval request; and
to further train the machine learning model using information pertaining to the rejection of the additional workflow approval request, wherein further training the machine learning model comprises tuning the machine learning model based at least in part on one or more tuning parameters, and wherein the one or more tuning parameters comprises a margin parameter pertaining to proximity to one or more closest data points and similarity to one or more classes from a hyperplane.

18. The apparatus of claim 17, wherein the machine learning model comprises a support vector machine learning model.

19. The apparatus of claim 17, wherein performing at least one automated action comprises outputting, to one or more workflow approval request personnel for manual action, an indication of non-rejection for the additional workflow approval request.

20. The apparatus of claim 17, wherein the at least one predefined threshold value comprises one or more confidence level thresholds attributed to one or more workflows.

* * * * *